United States Patent [19]
Misono et al.

[11] Patent Number: 5,430,553
[45] Date of Patent: Jul. 4, 1995

[54] DISC REPRODUCING APPARATUS

[75] Inventors: Kousuke Misono; Toshiyuki Ishii, both of Kanagawa; Kiyoshi Ota, Tokyo, all of Japan

[73] Assignee: Sony Corporation, Tokyo, Japan

[21] Appl. No.: 108,838

[22] Filed: Aug. 18, 1993

Related U.S. Application Data

[63] Continuation of Ser. No. 764,785, Sep. 24, 1991, abandoned.

[30] Foreign Application Priority Data

Oct. 1, 1990 [JP] Japan ................ 2-263470
Oct. 1, 1990 [JP] Japan ................ 2-263472
Oct. 1, 1990 [JP] Japan ................ 2-263473

[51] Int. Cl.⁶ .................................................. H04N 5/76
[52] U.S. Cl. ................................. 358/342; 358/343
[58] Field of Search ............. 358/342, 341, 343, 335, 358/310; 360/19.1; 369/48, 49, 47; H04N 5/91, 5/76, 5/78, 5/781, 5/782, 5/783, 9/79, 5/92

[56] References Cited

U.S. PATENT DOCUMENTS

| | | | |
|---|---|---|---|
| 4,698,695 | 10/1987 | Kosaka et al. | 358/342 |
| 4,872,067 | 10/1989 | Okatani | 358/342 |
| 4,872,068 | 10/1989 | Ishii et al. | 358/342 |
| 4,970,602 | 11/1990 | Yoshio | 358/342 |
| 5,063,551 | 11/1991 | Yoshio et al. | 358/342 |
| 5,128,774 | 7/1992 | Takayama | 358/342 |
| 5,150,113 | 9/1992 | Blüthgen | 358/342 |
| 5,166,804 | 11/1992 | Takahashi | 358/341 |
| 5,177,728 | 1/1993 | Otsubo et al. | 358/342 |

FOREIGN PATENT DOCUMENTS

| | | | |
|---|---|---|---|
| 5975327 | 4/1984 | Japan . | |
| 2139760 | 5/1990 | Japan | 358/335 |
| 2225147 | 5/1990 | United Kingdom | G11B 23/36 |

OTHER PUBLICATIONS

Vol. 14, No. 301 (P-1069)(4244) 28 Jun. 1990 & JP-A-02 094166 (Toshiba Corp.) 4 Apr. 1990.
Vol. 13, No. 412 (P-932) 12 Sep. 1989 & JP-A-01 150998 (Toshiba Corp.) 13 Jun. 1989.
Vol. 13, No. 505 (P-959)(3853) 14 Nov. 1989 & JP-A-01 204286 (Matsushita Electric Ind. Co. Ltd.) 16 Aug. 1989.
Vol. 14, No. 302 (E-946) 28 Jun. 1990 & JP-A-02 097183 (Asahi Optical Co. Ltd.) 09 Apr. 1990.
Vol. 13, No. 43 (P-821)(3391) 31 Jan. 1989 & JP-A-63 239665 (Toshiba Corp.) 5 Oct. 1988.
Vol. 12, No. 129 (P-692)(2976) 21 Apr. 1988 & JP-A-62 252588 (Seiko Epson Corp.) 04 Nov. 1987.

*Primary Examiner*—Tommy P. Chin
*Assistant Examiner*—Thai Tran
*Attorney, Agent, or Firm*—Mark C. Pickering; Limbach & Limbach

[57] ABSTRACT

An X-Y device and a pair of trigger switches provide user control of a disc reproducing apparatus that reproduces discs which include audio data, video data, or both audio and video data. The reproduced video data is presented on a display. The reproducing device determines whether audio data, video data, or both audio and video data are stored on the disc, and interprets commands generated by the X-Y device and the pair of trigger switches as commands to reproduce the audio data, the video data, or both the audio and video data, respectively, when the display is powered on. When the display is powered off, the reproducing apparatus interprets commands generated by the X-Y device and the pair of trigger switches as commands to reproduce only the audio data.

10 Claims, 7 Drawing Sheets

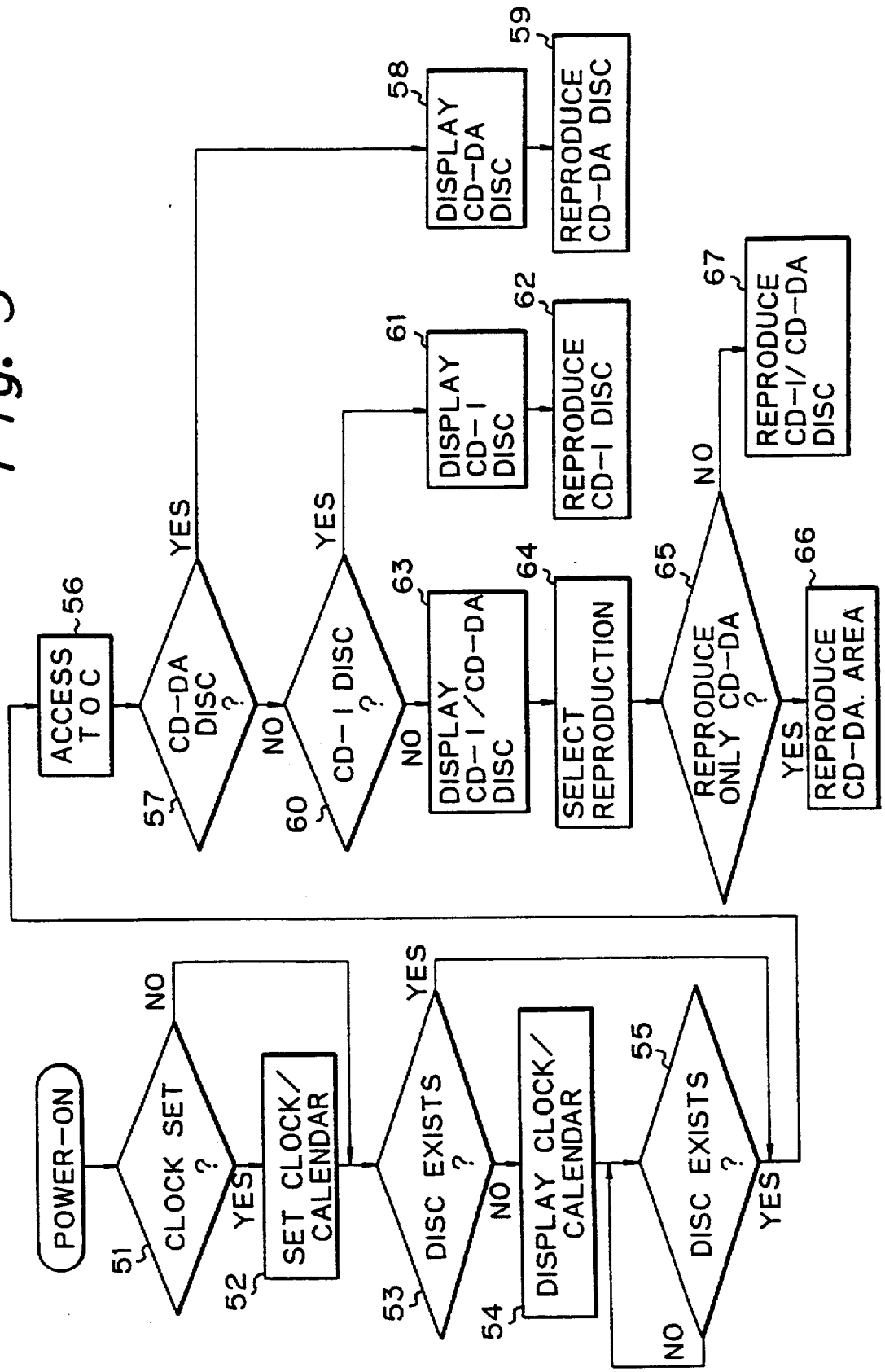

DISC REPRODUCING APPARATUS

This is a continuation of application Ser. No. 07/764,785 filed on Sep. 24, 1991, now abandoned.

BACKGROUND OF THE INVENTION

1. Field of the Invention

The invention relates to a disc reproducing apparatus which can reproduce a CD-I disc on which image data and the like in addition to audio data are recorded.

2. Description of the Prior Art

There has been proposed a CD-I (CD Interactive) system in which image data (natural image, animation, computer graphics, etc.), text data, program data, and the like in addition to audio data are recorded onto a CD (Compact Disc) and which can execute the operation in an interactive manner. Since such a CD-I system has a reproducing function of characters, images, audio data, computer data, etc., it can be used in AV industrial apparatuses mainly for the purpose of audio and video fields, electronic publishing which mainly handles characters, data base services mainly comprising information files, education and amusement which are mainly executed by interactive responses, and the like. Thus, the CD-I system is expected as a medium of a new format.

In the CD-I system, various specifications are predetermined so that it can be widely spread as a home-use system while maintaining compatibility. That is, in the CD-I system, a CPU of the 68000 type (microprocessor of 16 bits developed by Motorola Inc.) is used and an operating system which is fundamentally based on widespread OS9 is used as a real-time operating system which handles various kinds of files. Two trigger buttons and an X-Y device are used as an input device. Two audio and video systems are prepared as an output system. The CD-I player is constructed so that it can reproduce ordinary compact disc music.

As mentioned above, the CD-I player can reproduce not only a CD-I disc but also an ordinary compact disc for music (CD-DA disc). However, in the CD-I player, it is determined that two trigger buttons and an X-Y device are used as an input device. All of the operations must be performed by using at least those two trigger buttons and the X-Y device. Therefore, in the conventional CD-I player, even when a CD-DA disc is reproduced, the operations must be performed by the two trigger buttons and the X-Y device.

Therefore, there is considered a method whereby the operation keys of PLAY, STOP, AMS (Auto Music Scan), and the like which are used when reproducing a compact disc for musics are displayed on an initial screen of an LCD display, and when a CD-DA disc has been loaded, the operations of the operation keys which are displayed on the screen are executed by using two trigger buttons and an X-Y device. In the case of the CD-I disc, however, since those operation keys which are displayed are unnecessary, if the operation keys are always displayed as long as the CD-I disc has been loaded, the user becomes confused.

In the case of reproducing a CD-DA disc, since there is no need to display on the screen, there is considered a method whereby the LCD display is turned off and an electric power consumption is reduced. However, in the case where the operations to reproduce the CD-DA disc are executed by using two trigger buttons and an X-Y device while observing the screen, if the LCD display is turned off, an inputting operation cannot be performed.

OBJECTS AND SUMMARY OF THE INVENTION

It is, therefore, an object of the invention to provide a disc reproducing apparatus in which when a disc having a different format has been loaded, the operability can be improved without making the user confused.

Another object of the invention is to provide a disc reproducing apparatus which can also execute various kinds of operations even if an LCD display has been turned off.

According to an aspect of the invention, there is provided a disc reproducing apparatus for reproducing a disc on which audio data has been recorded or a disc on which at least image data in addition to audio data have been recorded, comprising:

audio means for reading and reproducing the audio data from the disc;

video means for reading image data from the disc and for forming a video signal in response to the image data;

display means for displaying the video signal;

discriminating means for reading data from a portion of the disc and for detecting whether audio data, image data, or both audio data and image data are present;

operating means for operating the audio means, the video means, or both the audio means and the video means; and switching means for switching the operation of the operating means in response to the type of data detected by the discriminating means;

external input means for generating commands for controlling the operating means;

support means for supporting the audio means, the video means, the display means, the discriminating means, the operating means, and the switching means.

The display means comprises an LCD display, for example. The LCD display is arranged on a cover portion which is arranged on a play main body so as to be freely opened or closed. In a state that the cover portion is opened, the LCD display is exposed, thereby enabling the video signal to be seen and enabling the display of the video signal to be operated. In a state that the cover portion is closed, the audio data can be reproduced and the reproduction of the audio data can be operated. Further, when the driving of the LCD display is stopped, the operating means functions as a special key for operating the audio reproduction.

When a disc is loaded, the kind of disc is discriminated from TOC (Table of Contents) data recorded on the disc. When a CD-DA disc has been loaded, operation keys of PLAY, STOP, AMS, etc. are displayed. When a CD-I disc has been loaded, those operation keys are erased. Therefore, when a CD-DA disc has been loaded, an audio reproduction can be easily performed. A situation such as when a CD-I disc has been loaded, an unnecessary display is displayed and the user is confused can be prevented. Further, in the case where a CD-DA disc or a CD-I/CD-DA disc (disc in which a CD-I format and a CD-DA format mixedly exist) has been loaded and only an audio reproduction is executed, two trigger buttons and an X-Y device which are used to reproduce the CD-I disc are made function as a special key for an audio reproduction. Thus, even when the driving of an LCD display has been stopped, various kinds of audio reproducing operations can be freely executed.

The above, and other, objects, features and advantage of the present invention will become readily apparent from the following detailed description thereof which is to be read in connection with the accompanying drawings.

BRIEF DESCRIPTION OF THE DRAWINGS

FIG. 5 is a flowchart which is used in the explanation of the operation of the embodiment of the invention.

DETAILED DESCRIPTION OF THE PREFERRED EMBODIMENTS

An embodiment of the invention will be described in accordance with the following order.

a. Construction of an embodiment
b. With respect to a CD-I format
 b1. Data structure
 b2. Writing of audio data
 b3. Writing of video data
 b4. Disc
 b5. Hardware
c. Internal construction of an embodiment
d. Operation of an embodiment
e. Operation when display is unnecessary a. Construction of an Embodiment FIGS. 1A and 1B are diagrams showing a whole construction of a CD-I player to which the invention has been applied.

Figure 1A:
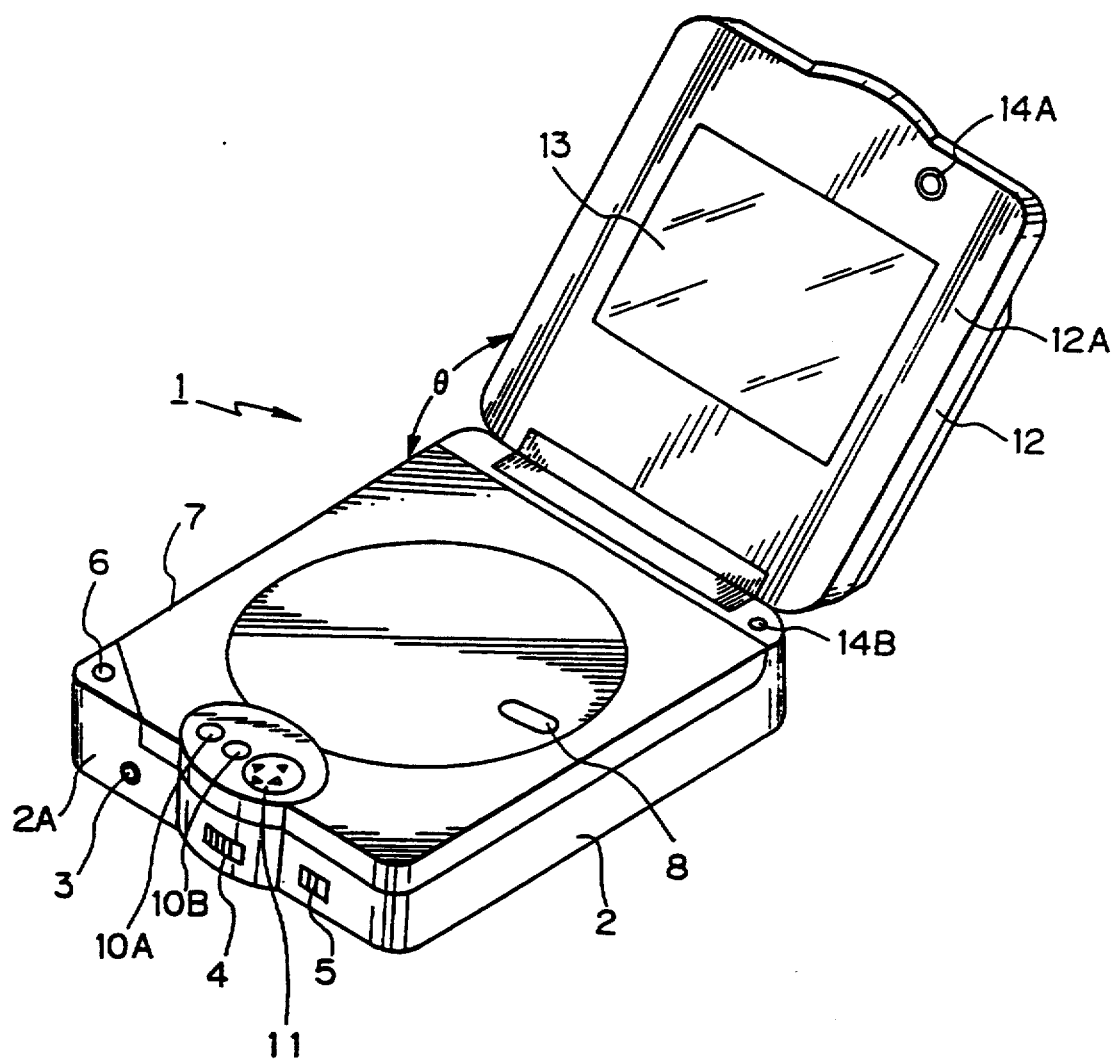
FIGS. 1A and 1B are perspective views showing an embodiment of the invention.
Figure 1B:
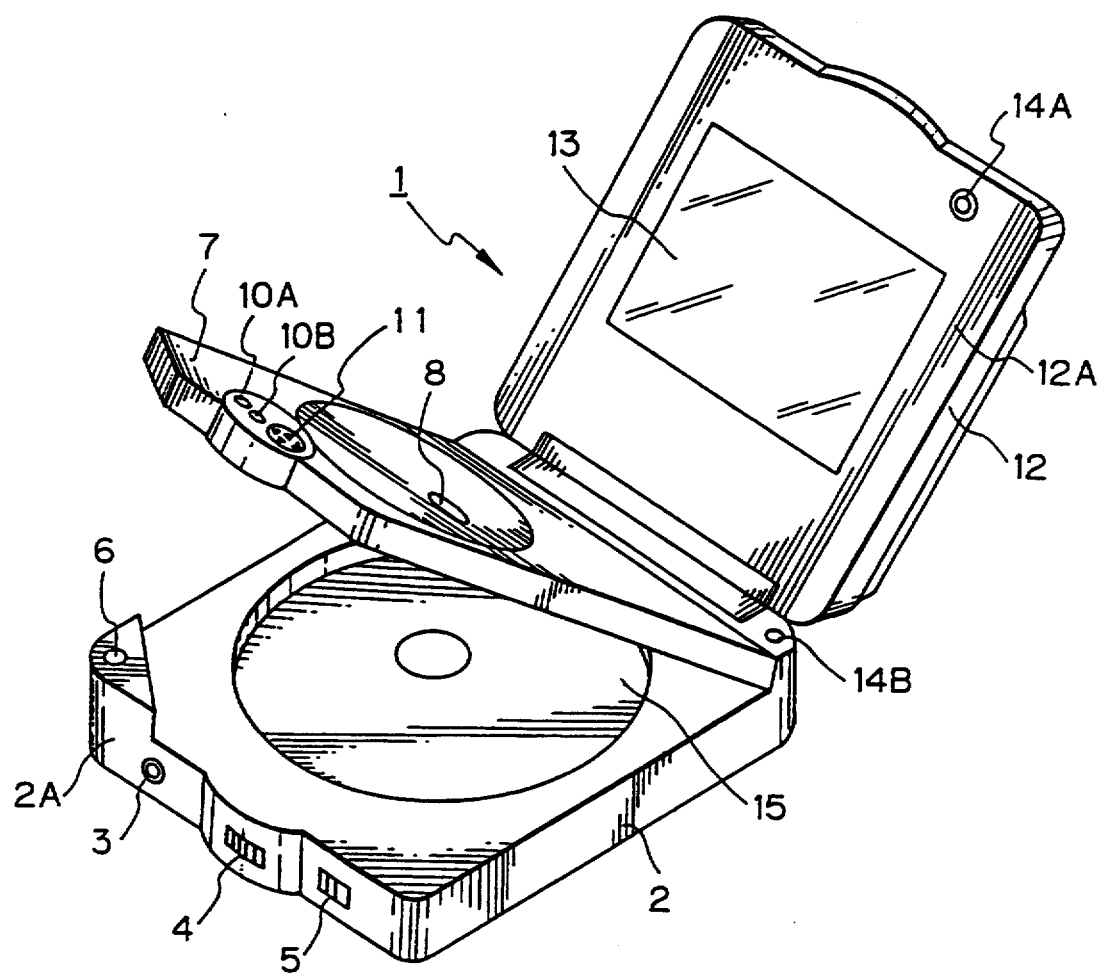

In FIGS. 1A and 1B, reference numeral 1 denotes a whole CD-I player to which the invention has been applied. In order to enable the CD-I player 1 to be easily carried to the outside an LCD display 13 is integrated and the size and weight of the CD-I player 1 are reduced by realizing an IC, using chip parts, and the like. Dimensions of the entire CD-I player 1 are set to, for instance, a width of 140 mm, a length of 170 mm, and a height of 60 mm.

A disc driving section to rotate the disc 15 which has been set, a head driving section to move the optical head in the radial direction of the disc, and a printed circuit board to process a reproduction signal from the optical head are enclosed in the casing of the player main body portion 2 of the CD-I player 1. Further, a computer comprising a CPU of the 68000 type is enclosed in the casing.

A head phones jack 3, a sound volume adjusting dial 4, and a power on/off switch 5 are arranged on a front side surface 2A of the player main body portion 2. An open button 6 is arranged on a front side upper edge of the player main body portion 2.

A middle cover 7 is rotatably arranged on the player main body portion 2 of the CD-I player 1. By depressing the open button 6, the middle cover 7 is opened as shown in FIG. 1B. When the middle cover 7 is opened, the disc can be loaded/unloaded. A window portion 8 is formed in the middle cover 7. A transparent member is used as a window portion 8. The rotating state of the loaded disc 15 can be checked through the window portion 8.

An X-Y device 11 and trigger buttons 10A and 10B are arranged on a front edge surface of the middle cover 7. The X-Y device 11 can designate positions in the X and Y directions by depressing portions which are deviated from the center in the vertical and horizontal direction, respectively.

A pointing device such as track ball, mouse, joy-stick, or the like can be used as such an X-Y device 11.

An outer cover 12 is rotatably arranged over the middle cover 7. The outer cover 12 can be manually opened.

The outer cover 12 can be opened to an opening/closing angle of 90° or more, and fixed to predetermined opening/closing angle of $\theta$. The LCD display 13 of a size of, e.g., 4 inches is arranged on a back surface 12A of the outer cover 12. By opening the outer cover 12, the LCD display 13 is exposed as shown in the figure, thereby enabling a picture plane of the LCD display 13 to be seen. An LCD driving switch 14A is also arranged on the back surface 12A of the outer cover 12. By operating the LCD driving switch 14A, the LCD display 13 can be on/off controlled. Reference numeral 14B denotes a switch to detect opening/closing of the outer cover 12 which is arranged on a rear side front edge surface of the play main body 2. By operating the switch 14B, the LCD display 13 may be on/off controlled depending on the opening/closing state of the outer cover 12. That is, when the outer cover 12 is opened, the driving of the LCD display 13 is turned on. When the outer cover 12 is closed, the driving of the LCD display 13 is turned off.

b. With Respect to a CD-I Format

The CD-I player to which the invention has been applied can reproduce a CD-I disc, a CD-I/CD-DA disc (disc in which a CD-I format and a CD-DA format mixedly exist), and a CD-DA disc (ordinary compact disc for reproducing a music) as discs. A data format of the CD-I will now be described.

b1. Data Structure

The CD-I records data in a format which is fundamentally based on the CD-ROM. A recording unit of the data is set to a block in a manner similar to the CD-ROM. One block is set to 2352 bytes. In the case of the disc having a diameter of 12 cm, a recording capacity of the whole CD-I disc is equal to about 640 Mbytes.

There are two kinds of data structures of the CD-I of a form 1 and a form 2. They correspond to a mode 1 and a mode 2 of the CD-ROM, respectively.

In the mode 1 in the CD-ROM, an error detection code and an error correction code are added to the data of one block, thereby enabling a strong error correction to be executed. In the mode 2 in the CD-ROM, none of the error detection code and the error correction code is added, thereby enabling a large amount of user's data to be assured.

In the CD-I, the form 1 and the form 2 can be designated every block and both of the forms 1 and 2 can be allowed to mixedly exist in one disc.

The CD-I format differs from the CD-ROM format with respect to a point that a sub-header of eight bytes is provided at the head of the user's data. Each block in which audio data, image, and data have been recorded is time-sharingly multiplexed to the sub-header on a block unit basis, and they are written twice and stored to process in a real-time manner. The sub-header comprises four items of a file number, a channel number, a sub-mode, and a data type.

Figure 2A:
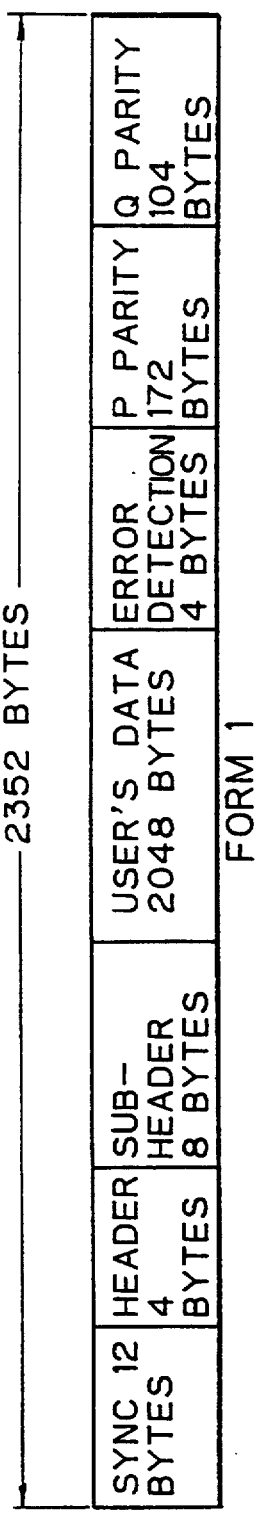
FIGS. 2A, 2B, and 3 are schematic diagrams which are used in the explanation of the specifications of a CD-I.

That is, FIG. 2A shows a structure of the form 1. In the form 1, a sync (12 bytes) is provided at the head. A header (4 bytes) is subsequently provided. Further, a sub-header (8 bytes) is provided. After that, user's data (2048 bytes) is provided. An error detection code EDC (4 bytes) and a P parity (172 bytes) and a Q parity (104 bytes) for error correction are added to the user's data. In the form 1, the error correcting capability is enhanced. The form 1 is suitable in the case of handling data such as character data, program data, or the like whose errors cannot be interpolated.

Figure 2B:
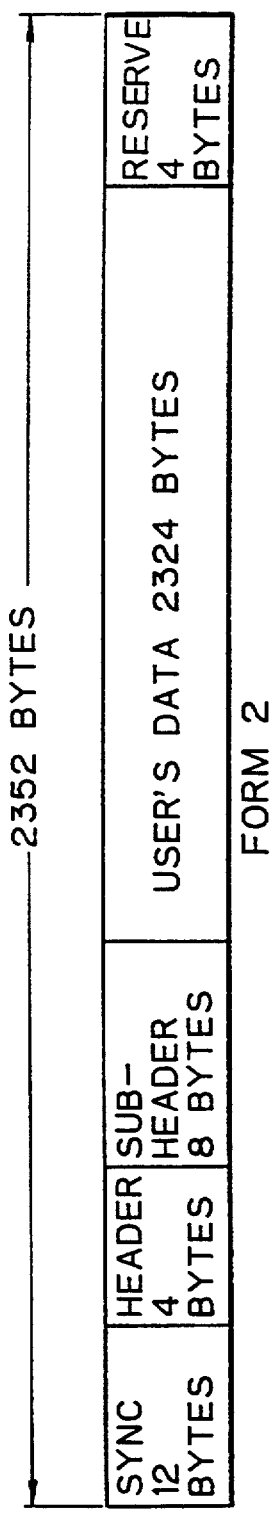

FIG. 2B shows a structure of the form 2. In the form 2, a sync (12 bytes) is provided at the head. A header (4 bytes) is subsequently provided. Further, a sub-header (8 bytes) is provided. After that, user's data (2324 bytes) is provided and a reserve area (4 bytes) is provided. The form 2 is suitable in the case of handling data such as audio data, video data, or the like which can be interpolated.

Figure 3:
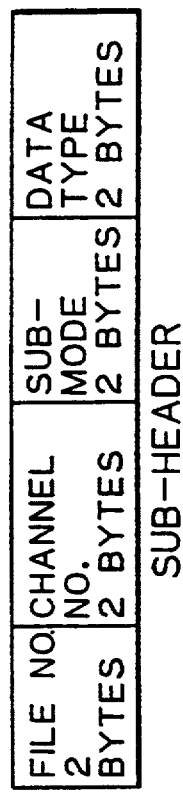

As shown in FIG. 3, the sub-header which is added to the head of the user's data comprises a file number (2 bytes), a channel number (2 bytes), a sub-mode (2 bytes), and a data type (2 bytes).

b2. Writing of Audio Data

Four modes are determined when audio data in CD-I is written.

One of the modes is based on the same recording system as that of the existing CD-DA in which the sampling frequency is set to 44.1 kHz and the number of quantization bits is set to 16 bits. This mode intends to perform a super Hi-Fi reproduction.

In another mode, an ADPCM (Adaptive Differential PCM) is used as a recording method. The sampling frequency is set to 37.8 kHz and the number of quantization bits is set to 8 bits. In this mode, a sound quality which is close to that of an LP record can be reproduced. The reproducing time is set to two hours in the stereophonic mode and is set to four hours in the monaural mode. This mode intends to perform a Hi-Fi reproduction.

In still another mode, the ADPCM is used as a recording method. The sampling frequency is set to 37.8 kHz and the number of quantization bits is set to 4 bits. In this mode, a sound quality which is close to that of an FM broadcasting can be reproduced. The reproducing time is set to four hours in the stereophonic mode and is set to eight hours in the monaural mode. This mode intends to perform a Hi-Fi reproduction of a long time.

In further another mode, the ADPCM is used as a recording method. The sampling frequency is set to 18.9 kHz and the number of quantization bits is set to 4 bits. The reproducing time is set to eight hours in the stereophonic mode and set to sixteen hours in the monaural mode. This mode intends to perform a speech reproduction.

b3. Writing of Video Data

Image data is processed as follows in accordance with the type of image data.

In the case of a natural image, the sampling frequency of a luminance signal Y is set to 7.6 MHz and the sampling frequencies of color difference signals U and V are set to 3.8 MHz. The image data is sampled at ratios of 4:2:2. Bits are compressed to four bits and recorded. They are returned to eight bits upon reproduction.

In the case of graphics, a CLUT (Color Lookup Table) is used. The CLUT graphics include three modes of 256 colors (8 bits), 128 colors (7 bits), and 16 colors (4 bits). Necessary colors can be selected from sixteen million colors and used.

In the case of an animation, a run length code is used. In this case, image data is compressed by using color information and a length between pixels. An animation on a full screen can be realized by using such a code.

b4. Disc

In the CD-I disc, mechanical dimensions such as outer diameter dimension, center hole dimension, thickness, and the like, optical parameters such as refractive index, reflectance, and the like, recording parameters such as disc rotating direction, recording linear velocity, track shape, track pitch, and the like, use environment situations, and the like are all similarly set those of an ordinary compact disc (CD-DA) for a music.

The disc is constructed in a manner such that it is possible to discriminate whether the disc is a CD-I disc or not on the basis of the contents in a TOC (Table of Contents) of a lead-in area of the disc. That is, in the CD-I disc or CD-I/CD-DA disc, a PSEC is set to 10 when (POINT=A0). On the other hand, in the other discs, the PSEC when (POINT=A0) is set to a value other than 10. For example, in the CD-DA disc, the PSEC when (POINT=A0) is set to 00. Therefore, from the PSEC when (POINT=A0), it is possible to judge whether the disc is a CD-I disc or a CD-I/CD-DA disc or another disc. Control fields of (POINT=A0, A1, A2) of the CD-I disc are set to (01×0). A control field of (POINT=A0) of the CD-I/CD-DA disc is always set to (01×0) and the other control fields are set to (00×0). Consequently, from the control field, it is possible to judge whether the disc is a CD-I disc or a CD-I/CD-DA disc.

b5. Hardware

In the CD-I, since audio data is included and a high-speed process in a real-time manner is needed, a process by a machine language is executed. As a CPU for such a purpose, a CPU of 16 bits of the 68000 type which has been developed by Motorola Inc. is designated. A CD-RTOS (Real-Time Operating System) which handles various kinds of files fundamentally uses the OS9 and the program is assembled as an ROM into the system. At least an X-Y device and two trigger buttons are prepared as an input device. Two systems of audio and video are prepared as an output. The CD-I player can reproduce a CD-DA for music.

c. Internal Construction of an Embodiment

Figure 4:
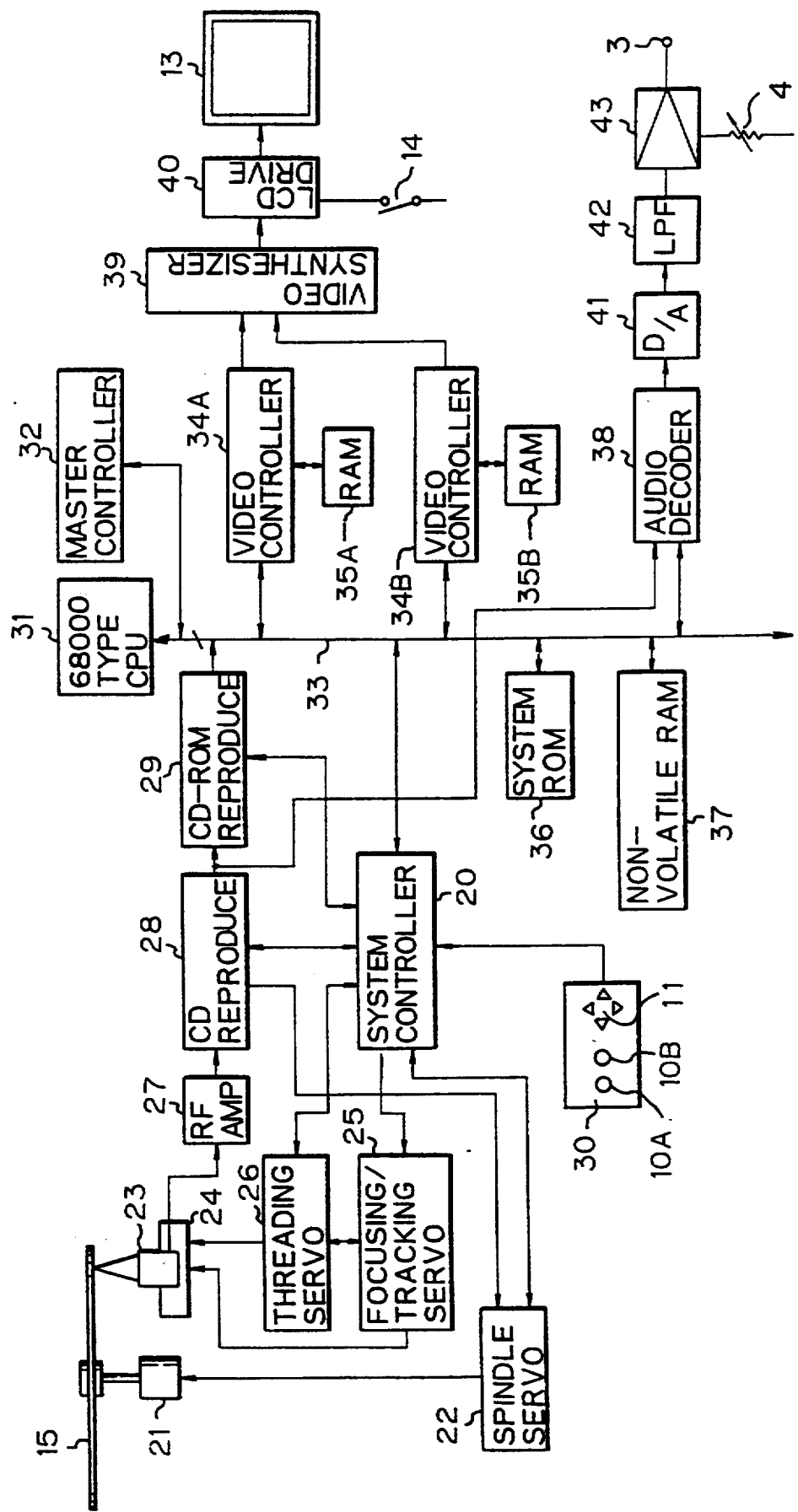
FIG. 4 is a block diagram showing an internal construction of the embodiment of the invention.

FIG. 4 shows an internal construction of the CD-I player 1 to which the invention has been applied.

In FIG. 4, a disc 15 is rotated by a spindle motor 21 at a CLV (constant linear velocity). The rotation of the spindle motor 21 is controlled by a spindle servo circuit 22 on the basis of clocks which are reproduced by a CD reproducing circuit 28. An output of a system controller 20 is supplied to the spindle servo circuit 22.

A recording signal on the disc 15 is reproduced by an optical head 23. The optical head 23 is supported, by a biaxial device. An output of a focusing/tracking servo circuit 25 is supplied to the biaxial device. The output of the system controller 20 is supplied to the focusing/tracking servo circuit 25. The focusing/tracking servo circuit 25 applies servo controls to two axes for the optical head 23 in the focusing direction and the tracking direction on the basis of an output of a photo detector.

The optical head 23 is made movable in the radial direction of the disc 15 by a slide feeding mechanism 24 using, for instance, a linear motor. The slide feeding mechanism 24 is controlled by a threading servo circuit 26. The output of the system controller 20 is supplied to the threading servo circuit 26. The optical head 23 can be accessed to a desired track position by the slide feeding mechanism 24.

An output of the optical head 23 is supplied to a CD reproducing circuit 28 through an RF amplifier 27. The CD reproducing circuit 28 comprises a reproducing circuit of bit clocks, an EFM demodulating circuit, a CIRC error correction circuit, and the like. The CD reproducing circuit 28 EFM demodulates the output of the optical head 23 and executes an error correcting process. The CD reproducing circuit 28 is controlled by the system controller 20.

An output of the CD reproducing circuit 28 is supplied to a CD-ROM reproducing circuit 29. The CD-ROM reproducing circuit 29 comprises a sync detecting circuit, a descrambling circuit, an error correction circuit, and the like. A sync signal is detected by the CD-ROM reproducing circuit 29 and the scramble is released. A header address is checked and a target block is accessed. In the case of the form 1, the error correcting process is further executed. The CD-ROM reproducing circuit 29 is controlled by the system controller 20.

An input from an input device 30 is given to the system controller 20. The input device 30 comprises the X-Y device 11 and two trigger buttons 10A and 10B.

Reference numeral 31 denotes a CPU to control the CD-I system. A CPU of the 68000 type is used as a CPU 31. A master controller 32 is connected to the CPU 31. The CPU 31 and the system controller 20 are bidirectionally connected. A bus 33 is led out of the CPU 31. One chip in which the CPU 31 and the master controller 32 are assembled can be also used.

The data reproduced by the CD-ROM reproducing circuit 29 is sent to the bus 33. RAMs 35A and 35B are connected to the bus 33 through video controllers 34A and 34B, respectively. A system ROM 36 and a non-volatile RAM 37 which is backed up by batteries are bidirectionally connected to the bus 33. An audio decoder 38 is connected to the bus 33.

The image data in the data reproduced by the CD-ROM reproducing circuit 29 is supplied to video controllers 34A and 34B under control of the CPU 31. Video signals based on the image data are formed by the video controllers 34A and 34B. The video signals are supplied to a video synthesizer 39. The video synthesizer 39 synthesizes the video signal from the video controller 34A and the video signal from the video controller 34B. An output of the video synthesizer 39 is supplied to the LCD display 13 via an LCD driving circuit 40. The driving of the LCD display 13 can be turned on/off by the LCD driving switch 14A. The switch 14B is turned on/off depending on an opening or closed state of the outer cover 12 (FIG. 1), and a signal indicating the on/off state of the switch 14B is supplied to the system controller 20.

The audio data in the data reproduced by the CD-ROM reproducing circuit 29 is supplied to the audio decoder 38 under control of the CPU 31. The audio decoder 38 ADPCM decodes the audio data based on the ADPCM and the like. The decoded audio data is supplied to the D/A converter 41 and is converted into the analog signal. The analog signal is generated from the head phones output terminal 3 through a low pass filter 42 and an amplifier 43. An audio signal level which is generated from the head phones output terminal 3 can be set by the sound volume adjusting dial 4.

d. Operation of an Embodiment

The operation of an embodiment of the invention will now be described. FIG. 5 shows the operation when the LCD display 13 is turned on. In this state, audio reproduction and image reproduction can be performed.

In FIG. 5, when the power source is turned on by the power on/off switch 5 (FIG. 1), a check is made to see if a calendar and an internal clock have been set or not (step 51).

In the case of setting the calendar and the internal clock, the calendar and the internal clock are set by using the X-Y device 11 and the trigger buttons 10A and 10B (step 52). After the calendar and the internal clock were set, a check is made to see if the disc has been loaded or not (step 53).

If the calendar and the internal clock are not set in step 51, step 53 follows and a check is made to see if the disc has been loaded or not.

Figure 6A:
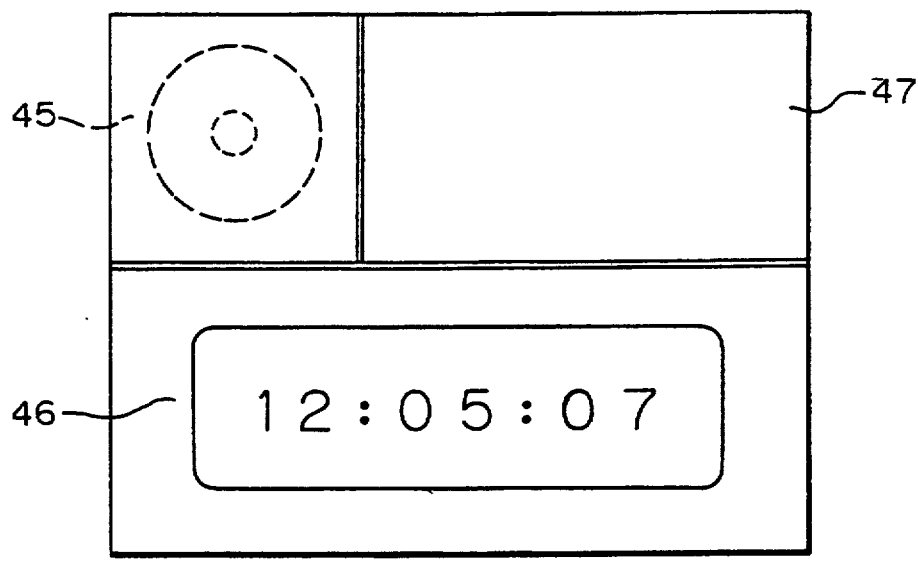
FIGS. 6A, 6B, 6C, and 6D are schematic diagrams which are used to illustrate the displays in the embodiment of the invention.

If the disc is not loaded, an indication of the unloaded state of the disc is displayed by the LCD display 13 (step 54). That is, if the disc is not loaded, as shown in FIG. 6A, an indication of the unloaded state of the disc is displayed in a display area 45 of the LCD display 13 and the calendar and the time are displayed in a display area 46.

The discrimination regarding the loading of the disc is continued (step 55).

If it is detected in step 53 or step 55 that the disc has been loaded, the TOC of the innermost rim of the disc is accessed (step 56).

From the data of the TOC, a check is first made to see if the loaded disc is a CD-I/CD-DA disc or a CD-I disc or a CD-DA disc (step 57). That is, in the case of the CD-I disc or CD-I/CD-DA disc, PSEC when (POINT=A0) is set to 10. In the case of another disc, since PSEC when (POINT=A0) has been set to a value other than 10, e.g., 00 in the CD-DA disc, a check is made from the PSEC when (POINT=A0) to see if the disc is a CD-I disc or a CD-DA disc.

Figure 6B:
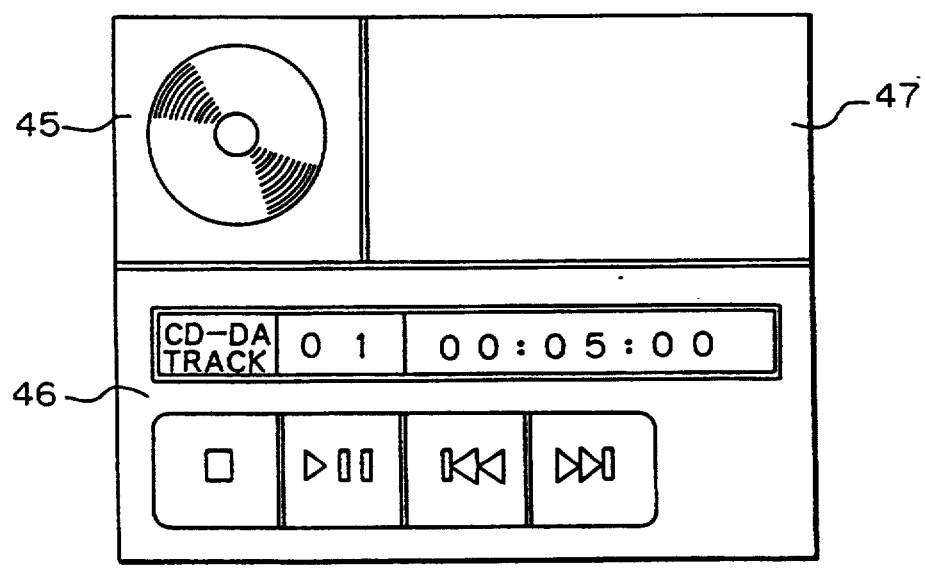

If it is decided that the disc is the CD-DA disc, an indication when the CD-DA disc has been loaded is displayed in the LCD display 13 (step 58). That is when the CD-DA disc has been loaded, as shown in FIG. 6B, a content indicating that the disc has been loaded is displayed in the display area 45 of the LCD display 13. An indication of an operation key such as PLAY, AMS, STOP, etc. to operate the CD-DA is displayed in the display area 46.

When the operation key displayed in the display area 46 is operated by using the X-Y device 11 and the trigger buttons 10A and 10B, the CD-DA disc is reproduced in accordance with the above operation (step 59).

If it is determined in step 57 that the disc is not the CD-DA disc, a check is made to see if the disc is a CD-I disc or a CD-I/CD-DA disc (step 60). Namely, control fields of (POINT=A0, A1, A2) of the CD-I disc are set to (01×0) and a control field of (POINT=A0) of the CD-I/CD-DA disc is always set to (01×0). The other control fields are set to (00×0). Therefore, from the control field, it is judged whether the disc is the CD-I disc or the CD-I/CD-DA disc.

Figure 6C:
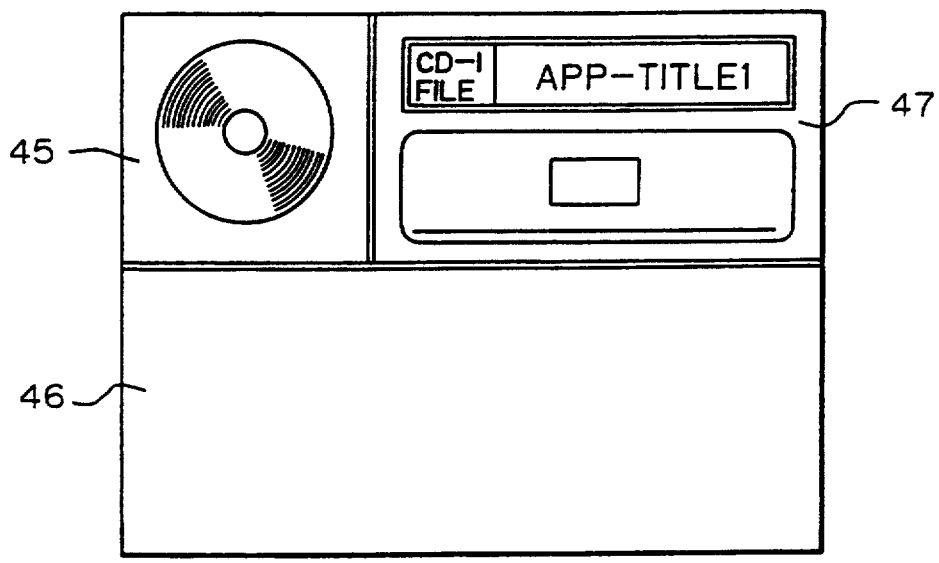

If it is determined that the loaded disc is the CD-I disc, an indication when the CD-I disc has been loaded is displayed on the LCD display 13 (step 61). That is, if the CD-I disc has been loaded, as shown in FIG. 6C, an indication showing that the disc has been loaded is displayed in the display area 45 of the LCD display 13. A title and the like of an application software are displayed in the display area 47.

When operating by using the X-Y device 11 and the trigger buttons 10A and 10B in accordance with an instruction of the application software, the CD-I disc is reproduced in accordance with the operation (step 62).

Figure 6D:
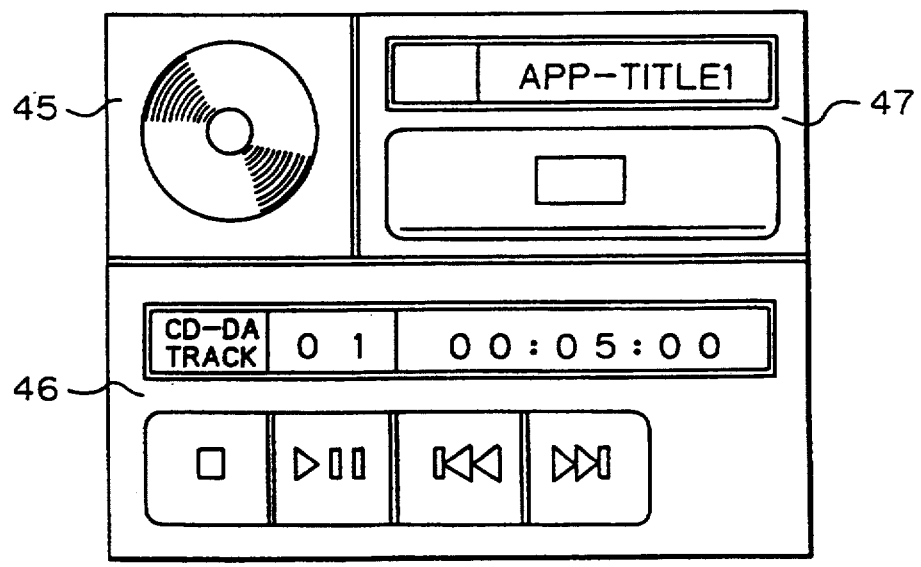

If it is decided that the loaded disc is the CD-I/CD-DA disc, an indication when the CD-I/CD-DA disc has been loaded is displayed on the LCD display 13 (step 64). That is, when the CD-I/CD-DA disc has been loaded, as shown in FIG. 6D, an indication showing that the disc has been loaded is displayed in the display area 45 of the LCD display 13. An indication of the operation key such as PLAY, AMS, STOP, or the like to operate the CD-DA is displayed in the display area 46. The title and the like of the application software are displayed in a display area 47.

In the case of the CD-I/CD-DA disc, a check is made to see if only the CD-DA is reproduced or not (step 65). When the operation key displayed in the display area 46 is operated by using the X-Y device 11 and the trigger buttons 10A and 10B, only the portion of the CD-DA area is reproduced in accordance with the operation (step 66). When operating by using the X-Y device 11 and the trigger buttons 10A and 10B in accordance with the instruction of the application software, the CD-I/CD-DA is reproduced in accordance with the operation (step 67).

As mentioned above, according to an embodiment of the invention, in the case of the CD-I/CD-DA disc, only the CD-DA area can be reproduced. Thus, only the sounds of the application software can be enjoyed.

e. Operation When Display is Unnecessary

In the case of reproducing the CD-DA disc, only the audio data is reproduced, so that there is no need to display on the LCD display 13. In the case of reproducing only the audio data from the CD-I/CD-DA disc as well, there is no need to display on the LCD display 13. As mentioned above, if the LCD display 13 is driven when the screen display is unnecessary, electric power is unnecessarily consumed. In the embodiment of the invention, therefore, when there is no need to display a screen, by enabling the LCD display 13 to be turned off by the LCD driving switch 14, electric power consumption can be reduced.

If the LCD display 13 is turned off, however, it is impossible to execute the operation while looking at the indication on the LCD display 13. It is also possible to provide special keys for audio reproduction in addition to the X-Y device 11 and the trigger buttons 10A and 10B. However, if such keys are provided, the number of keys increases and the apparatus enlarges in size. In the embodiment of the invention, accordingly, the X-Y device 11 and the trigger buttons 10A and 10B are allowed to function as special keys for audio reproduction when the loaded disc is the CD-DA disc and the driving of the LCD display 13 has been turned off or when the loaded disc is the CD-DA disc and only the audio reproduction is executed and the driving of the LCD display 13 has been turned off. That is, for instance, the left direction and the right direction of the X-Y device 11 function as an "AMS key", the trigger button 10A functions as a "PLAY/PAUSE key", and the trigger button 10B functions as a "STOP key". Consequently, even when the driving of the LCD display 13 has been stopped, various audio reproducing operations can be freely executed.

In the case of turning on/off the driving of the LCD display 13 by the switch 14B to detect an opening or closed state of the outer cover 12, the driving of the LCD display 13 is turned on by the switch 14B when the outer cover 12 is open, so that an audio reproduction and an image reproduction are executed. When the outer cover 12 is closed, the driving of the LCD display 13 is turned off and only an audio reproduction is performed. In this case, the functions of the trigger buttons 10A and 10B and the X-Y device 11 are switched as mentioned above in accordance with the opening or closed state of the outer cover 12. When the outer cover 12 is closed, the CD-I disc cannot be reproduced. In the case of the CD-I/CD-DA disc, only the CD/DA area can be reproduced.

Further, since a video reproduction is not performed for a CD-DA disc, when a CD-DA disc has been loaded, the trigger buttons 10A and 10B and the X-Y device 11 can be allowed to function as a special key for an audio reproduction irrespective of the on/off state of the LCD display 13. It is also possible to construct in a manner such that the trigger buttons 10A and 10B and the X-Y device 11 are made function as a special key for an audio reproduction if the LCD display 13 has been turned off independently of the kind of disc.

According to the invention, when a disc is loaded, the kind of disc is discriminated from the TOC data. When a CD-DA disc is loaded, the operation keys such as PLAY, STOP, AMS, and the like are displayed. When a CD-I disc is loaded, those operation keys are erased. Therefor, when a CD-DA disc is loaded, the audio reproduction can be easily executed. A situation such that in the case where a CD-I disc has been loaded, an unnecessary display is displayed and the user becomes confused can be prevented. On the other hand, when a CD-I/CD-DA disc is loaded, the operation keys such as PLAY, STOP, AMS, and the like are displayed and only the audio reproduction can be executed by operating those keys.

What is claimed is:

1. A disc reproducing apparatus for reproducing either audio data, video data, or both audio data and video data recorded on a disc, the apparatus comprising:

audio means for reproducing audio data stored on the disc;

video means for reproducing video data stored on the disc and for generating reproduced video data in response thereto;

display means for displaying the reproduced video data and a control screen;

discriminating means for reading disc-type data from the disc, the disc-type data indicating whether the disc includes audio data, video data, or both audio data and video data;

control means for generating the control screen and for controlling either the audio means, the video means, or both the audio means and the video means in response to the disc-type data detected by the discriminating means;

external input means for generating commands that control the control means;

switch means for providing power to and for removing power from the display means, thereby turning off and turning on the display means;

special key means for interpreting said commands from the external input means as commands for the audio means when power has been removed from the display means; and support means for supporting the audio means, the video means, the display means, the discriminating means, the special key means, the control means, and the switch means.

2. An apparatus according to claim 1 wherein the external input means comprises an X-Y pointing device and a plurality of trigger switches.

3. An apparatus according to claim 1 wherein the display means comprises an LCD display and driving means for driving the LCD display.

4. An apparatus according to claim 1 wherein the control screen includes a plurality of operation keys when the disc-type data indicates that only audio data is present, application information when the disc-type data indicates that only video data is present, and both the plurality of operation keys and the application information when the disc-type data indicates that both audio data and video data are present.

5. An apparatus according to claim 1 wherein the supporting means comprises:

a player main body section;

a cover section connected to the player main body section and movable between an open position and a closed position.

6. An apparatus according to claim 5 wherein the switch means comprises:

cover switch means for sensing whether the cover section is in the open position or the closed position, for providing power to the display means when the cover section is in the open position and for removing power from only the display means when the cover section is in the closed position; and change-over switch means for turning on/off the display means when the cover section is in the open position.

7. An apparatus according to claim 2 wherein a right direction key and a left direction key of the X-Y pointing device are made to correspond to a forward SEARCH and a backward SEARCH, respectively.

8. An apparatus according to claim 4 and further comprising means for displaying a present date and time, wherein the date and time are not displayed when a disc is loaded, and wherein when the disc is unloaded, the date and time are displayed.

9. A disc reproducing apparatus for reproducing either audio data, video data, or both audio data and video data recorded on a disc, the apparatus comprising:

audio means for reproducing audio data stored on the disc and for generating reproduced audio data in response thereto;

video means for reproducing video data stored on the disc and for generating reproduced video data in response thereto;

discriminating means for determining whether audio data, video data, or both audio data and video data are stored on the disc;

display means for displaying the reproduced video data, an audio control screen, a video control screen, and an audio/video control screen;

switch means for providing power to and for removing power from the display means, thereby turning off and turning on the display means;

external input means for generating a plurality of control signals;

first control means for generating the audio control screen and for controlling the audio means in response to the plurality of control signals when only audio data is stored on the disc and the display means is turned on;

second control means for generating the video control screen and for controlling the video means in response to the plurality of control signals when only video data is stored on the disc and the display means is turned on;

third control means for generating the audio/video control screen and for controlling the audio means and the video means in response to the plurality of control signals when both audio data and video data are stored on the disc and the display means is turned on; and fourth control means for controlling the audio means in response to the plurality of control signals when the display means is turned off, and audio data is stored on the disc.

10. A disc reproducing apparatus for reproducing either audio data, video data, or both audio data and video data recorded on a disc, the apparatus comprising:

audio means for reproducing audio data stored on the disc and for generating reproduced audio data in response thereto;

video means for reproducing video data stored on the disc and for generating reproduced video data in response thereto;

discriminating means for determining whether audio data, video data, or both audio data and video data are stored on the disc;

display means for displaying the reproduced video data and a control screen;

switch means for providing power to and for removing power from the display means, thereby turning off and turning on the display means;

external input means for generating a plurality of control signals; and control means for generating the control screen, for controlling the audio means and the control screen in response to the plurality of control signals when only audio data is stored on the disc and the display means is turned on, for controlling the video means and the control screen in response to the plurality of control signals when only video data is stored on the disc and the display means is turned on, for controlling the audio means, the video means, and the control screen in response to the plurality of control signals when both audio data and video data are stored on the disc and the display means is turned on, and for controlling the audio means in response to the plurality of control signals when the display means is turned off, and audio data is stored on the disc.

* * * * *